United States Patent
Wright

(10) Patent No.: US 7,623,565 B2
(45) Date of Patent: Nov. 24, 2009

(54) METHOD FOR PROVIDING PACKET FRAMING IN A COMMUNICATION SYSTEM

(75) Inventor: David Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 580 days.

(21) Appl. No.: 11/206,373

(22) Filed: Aug. 17, 2005

(65) Prior Publication Data

US 2006/0062282 A1   Mar. 23, 2006

Related U.S. Application Data

(60) Provisional application No. 60/611,581, filed on Sep. 20, 2004.

(51) Int. Cl.
*H04B 1/707* (2006.01)
(52) U.S. Cl. .................... 375/146
(58) Field of Classification Search ........... 375/140, 375/141, 146
See application file for complete search history.

(56) References Cited

U.S. PATENT DOCUMENTS

| | | | | |
|---|---|---|---|---|
| 5,999,561 A | * | 12/1999 | Naden et al. ............ | 375/142 |
| 6,163,533 A | * | 12/2000 | Esmailzadeh et al. ..... | 370/342 |
| 6,175,560 B1 | * | 1/2001 | Bhagalia et al. ......... | 370/342 |
| 6,549,564 B1 | * | 4/2003 | Popovic ................. | 375/142 |
| 6,781,999 B2 | * | 8/2004 | Eyuboglu et al. ........ | 370/399 |
| 2005/0030919 A1 | * | 2/2005 | Lucidarme et al. ....... | 370/328 |

OTHER PUBLICATIONS

Cypress, Wireless USB LS Theory of Operation, Aug. 19, 2003, pp. 1-4.
Roberts, Spread Spectrum Scene, The ABCs of Spectrum—A Tutorial, Sep. 23, 2004, pp. 1-9.
Spread Spectrum Scene, Spread Spectrum Background, Oct. 12, 2004, pp. 1-4.
Siliconians, What is spread spectrum?, pp. 1-2.
International Search Report and Written Opinion of the International Searching Authority, PCT/US05/31173 filed Aug. 31, 2005, mailed Jul. 3, 2008.

* cited by examiner

*Primary Examiner*—Kevin Y Kim

(57) ABSTRACT

An improved method of framing data packets in a direct sequence spread spectrum (DSSS) system that uses one pseudo-noise code (PN-Code) to frame the packet with a start-of-packet (SOP) and end-of-packet (EOP) indicator, and a different PN-Code to encode the data payload. Furthermore, the SOP is represented by the framing PN-Code, and the EOP is represented by the inverse of the framing PN-Code. This method creates a robust framing system that enables a DSSS system to operate with a low threshold of detection, thus maximizing transmission range even in noisy environments. Additionally, the PN-Code used for the SOP and EOP indicators can be used to indicate an acknowledgement response.

20 Claims, 3 Drawing Sheets

METHOD FOR PROVIDING PACKET FRAMING IN A COMMUNICATION SYSTEM

RELATED APPLICATIONS

This application is a non-provisional application, of provisional application Ser. No. 60/611,581, filed Sep. 20, 2004. Priority of application 60/611,581 is hereby claimed. The entire contents of application 60/611,581 are hereby incorporated by reference.

FIELD OF THE INVENTION

The present invention relates generally to electronic circuits, and in particular to circuits for wireless communications

BACKGROUND OF THE INVENTION

Direct sequence spread spectrum (DSSS) is a popular means for radio frequency (RF) communication. The advantage of DSSS is that it creates a more robust signal that is less susceptible to interference or eavesdropping versus a traditional narrowband RF system. The key to DSSS is the 'spreading' of the signal across a wide frequency range. This enables DSSS to operate with a very low signal to noise ratio (SNR) and still be operable.

DSSS spreads the signal across a wide frequency range by increasing the frequency content of the data to be transmitted. In a digital data system this is typically accomplished by encoding each logical 1 and 0 of the data to be transmitted with a multi-bit word. For example, encoding data with a 10-bit word would require ten times the bandwidth to transmit versus sending a single bit of unencoded data.

In DSSS, the multi-bit word is called a pseudo-noise code (referred to herein as a PN-Code). Also, a PN-Code is commonly referred to as a multi-chip word, with a chip referring to a bit of encoded data. This means that a bit of data before encoding is referred to as a bit, whereas a bit of data after encoding with the PN-Code is referred to as a chip. Typically the transmitter replaces a logical 0 data bit with the PN-Code and a logical 1 data bit with the inverse of the PN-Code.

A DSSS receiver typically decodes the received data using a correlator circuit. The correlator circuit compares the most recently received chips against the PN-Code. The correlator then indicates a "hit" if the number of chips that are a match exceeds a pre-determined threshold level, with the pre-determined threshold level in essence controlling the hit sensitivity of the decoder.

In systems where data is sent asynchronously, a mechanism for detecting the start of a packet (SOP) is necessary. This is typically accomplished in a DSSS system by looking for the first hit detected by the correlator after a period of time during which there were no hits. In prior art DSSS systems a single PN-Code is typically used to encode both the data and the SOP indication.

Once the SOP has been detected the data packets that follow the SOP are continually decoded. In some systems, the absence of data for a specified period of time is taken as an indication of the end of a packet. In other systems an end-of-packet (EOP) indicator is used to indicate the end of a packet.

A problem that sometimes occurs when using a first match to determine the SOP is that random noise may create a false correlation hit that results in a premature SOP indicator. False correlation is a factor of chip pattern duration, the amount of over-sampling in the receiver, and the threshold level. A 32-chip pattern duration of 1 uS with 4× over-sampling and a threshold level requiring a perfect match would result in a false correlation rate of 1 in every 1000 seconds. However, the false correlation rate drops to 1 in every 2.5 mS if the correlation threshold is reduced from 32-chips to 27-chips.

Another problem that sometimes occurs when using a first match to determine the SOP is that the first part of the packet may be missed as a result of interference or because the receiver was turned on mid-packet, thus the first hit is interpreted as the SOP when in reality it is part of the data packet. The data packet would then be erroneously received as complete when in actuality only a portion of the data packet was received.

Another problem that occurs in systems that do not use an EOP indicator is that missing packets can falsely signal an EOP. The next correlator hit would then falsely be interpreted as a SOP.

SUMMARY OF THE INVENTION

The present invention provides for an improved direct sequence spread spectrum (DSSS) method and system that uses two different PN-codes. The start of packet (SOP) indicator uses a first PN-Code, while the data payload is encoded with a second PN-Code. Since the PN-code used for the SOP is different from the PN-code used for the data, the chance of a false SOP indication is minimized.

The SOP can include two instances of the PN-Code instead of one in order to further minimize the chances of a false SOP indication due to noise and interference. In some embodiments, the first PN-Code is also used to generate an end of packet (EOP) indication. Furthermore, the EOP utilizes the inverse of the PN-Code in order to distinguish it from the SOP.

In still another embodiment, the PN-Code used for SOP and EOP is used to indicate an acknowledgement (ACK) of data received. The ACK signal consists of one instance of the PN-Code followed by one instance of the inverse of the PN-Code. Use of this type of an ACK signal minimizes the overhead required for such an indicator.

DETAILED DESCRIPTION

Figure 1:
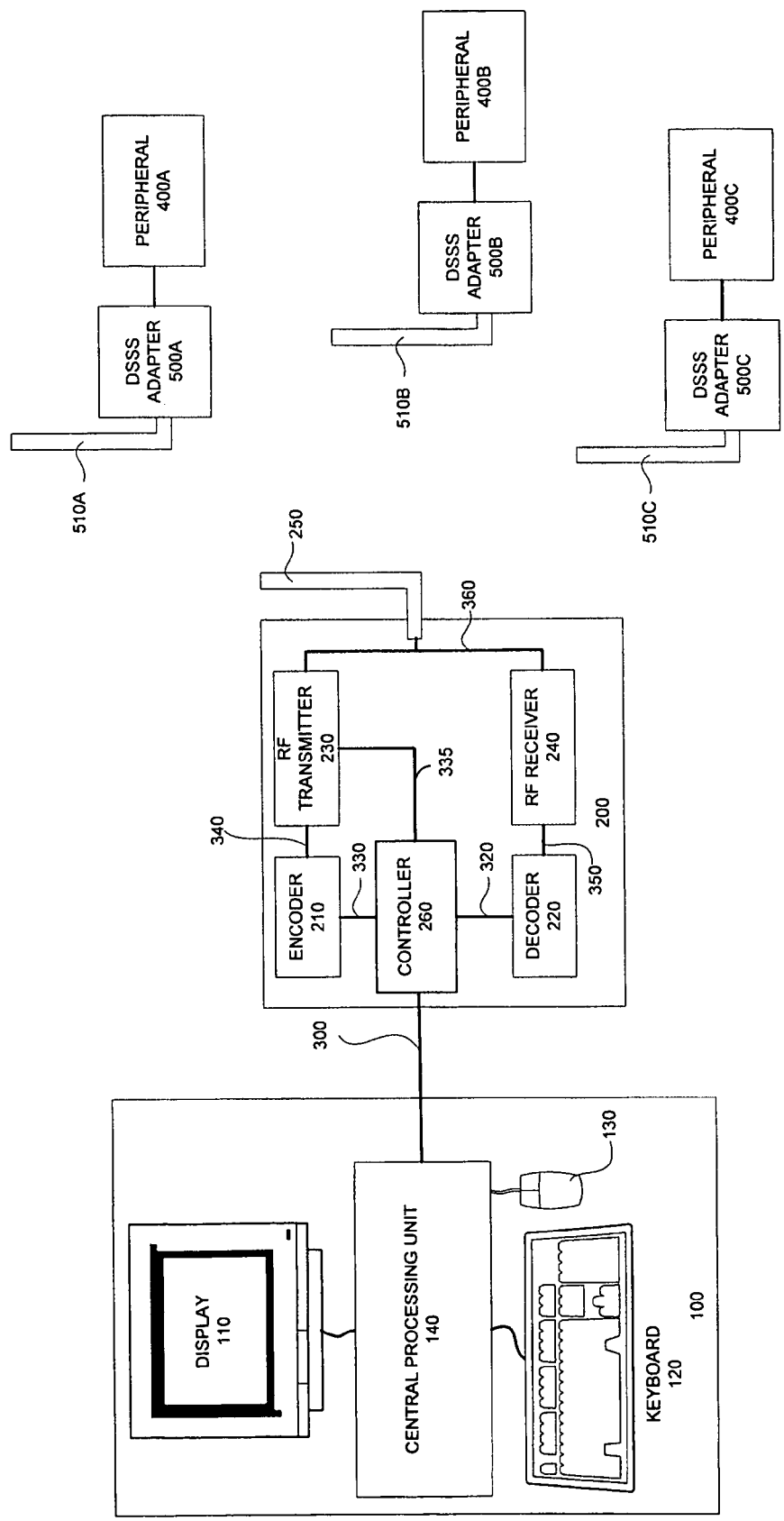
FIG. 1 is a diagram providing an overview of a first embodiment.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

A typical DSSS system of a first embodiment is shown in FIG. 1. In this embodiment a computer 100 is connected to peripheral devices 400A, 400B and 400C using a wireless direct sequence spread spectrum (DSSS) connection.

The computer 100 is connected to a DSSS adapter 200. Adapter 200 has an associated antenna 250. The peripheral devices 400A, 400B and 400C are connected to DSSS adapters 500A, 500B and 500C. DSSS adapters 500A, 500B and 500C respectively have antennas 510A, 510B and 510C. DSSS adapters 500A, 500B and 500C are identical to DSSS adapter 200. Thus, the following description will only focus on DSSS adapter 200 and antenna 250 in order to simplify the discussion; however, the discussion applies equally to the other adapters.

The computer 100 includes a display 110, keyboard 120, mouse 130, and central processing unit (CPU) 140. These units are conventional and perform the functions of a conventional computer system.

DSSS adapter 200 includes a controller 260, encoder 210, radio frequency (RF) transmitter 230, antenna 250, RF receiver 240, and decoder 220.

Controller 260 controls the communication between adapter 200 and the computer 100. Controller 260 communicates with the computer using a conventional connection 300. Connection 300 can be any common computer interface such as those known as USB, IEEE 1394, Ethernet, RS-232 serial port, and parallel port. It may also be any other type of interface that allows for communication. In an alternate embodiment, connection 300 is a direct connection to the internal bus structure of the CPU 140. Controller 260 is also responsible for initializing the DSSS adapter 200 and for performing housekeeping functions.

Encoder 210 is used to encode data for transmission. RF transmitter 230 modulates the encoded data with an RF carrier to create an RF signal. Antenna 510 is used to broadcast the RF signal to DSSS receivers.

Antenna 510 receives the RF signals broadcast by other DSSS transmitters. RF receiver 240 demodulates the RF signal to recover the encoded data stream from the RF carrier. Decoder 220 decodes the encoded data stream. The RF transmitter 230, the RF receiver 240 and antenna 250 are conventional.

The following discussion will explain the operation of the embodiment described above.

Figure 2:
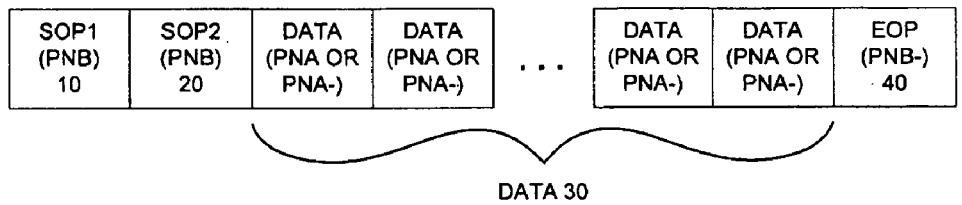
FIG. 2 shows a preferred embodiment of the packet framing mechanism.

Transmitting Data: FIG. 2 illustrates the sequence of events that occurs when data is transmitted.

The first step is to transmit two start-of-packet (SOP) indicators, SOP1 10 and SOP2 20. Each one of these indicators consists of a PN-Code PNB. By using two PN-Codes back-to-back the chance of random noise or interference being mistaken for the SOP is greatly reduced. It is highly unlikely that random noise or interference will create the same pattern twice even if the threshold of the correlator is set to a low level.

Next, the data 30 is encoded using a PN-Code PNA. The data is encoded in a conventional manner. That is, two different patterns, one being PNA itself and the other being the inverse of PNA referred to as PNA, are used to represent binary "0" and binary "1".

By using two different PN-Codes, one PN-Code (herein referred to as PNA) to encode the data, and another PN-Code (herein referred to as PNB) for the SOP, there is very little chance that the receiver will ever confuse the data 30 with the SOP or vice-versa.

Finally, after all the data has been sent, a single end-of-packet (EOP) indicator EOP 40 is sent. EOP 40 is the inverse of PN-Code PNB. This inverse code is herein referred to as PNB-. By using PNB- for EOP 40 there is very little (in fact practically no) chance that the EOP code will be mistaken for the SOP code. Also, by using one PN-Code (PNA) to encode the data and another PN-Code (PNB-) for EOP there is very little chance that the receiver will ever confuse data 30 with EOP 40 or vice-versa, even if the threshold of the correlator is set to a low level.

The method of sending framed packetized data will now be described in more detail with reference to FIGS. 1 and 2. A data packet to be transmitted originates in the computer 100. It is then sent to the DSSS adapter 200 over connection 300 to controller 260. Controller 260 then does two things. First, it sends out the start-of-packet sequence (SOP1 10 and SOP2 20) to the RF transmitter 230 using connection 335. This entails sending PN-Code PNB twice to the RF transmitter 230. The RF transmitter 230 will modulate the SOP sequence onto an RF carrier and send the resultant signal over connection 360 to antenna 250 for broadcast. Second, the controller sends the data (data 30) to encoder 210 over connection 330 for encoding.

Figure 3:
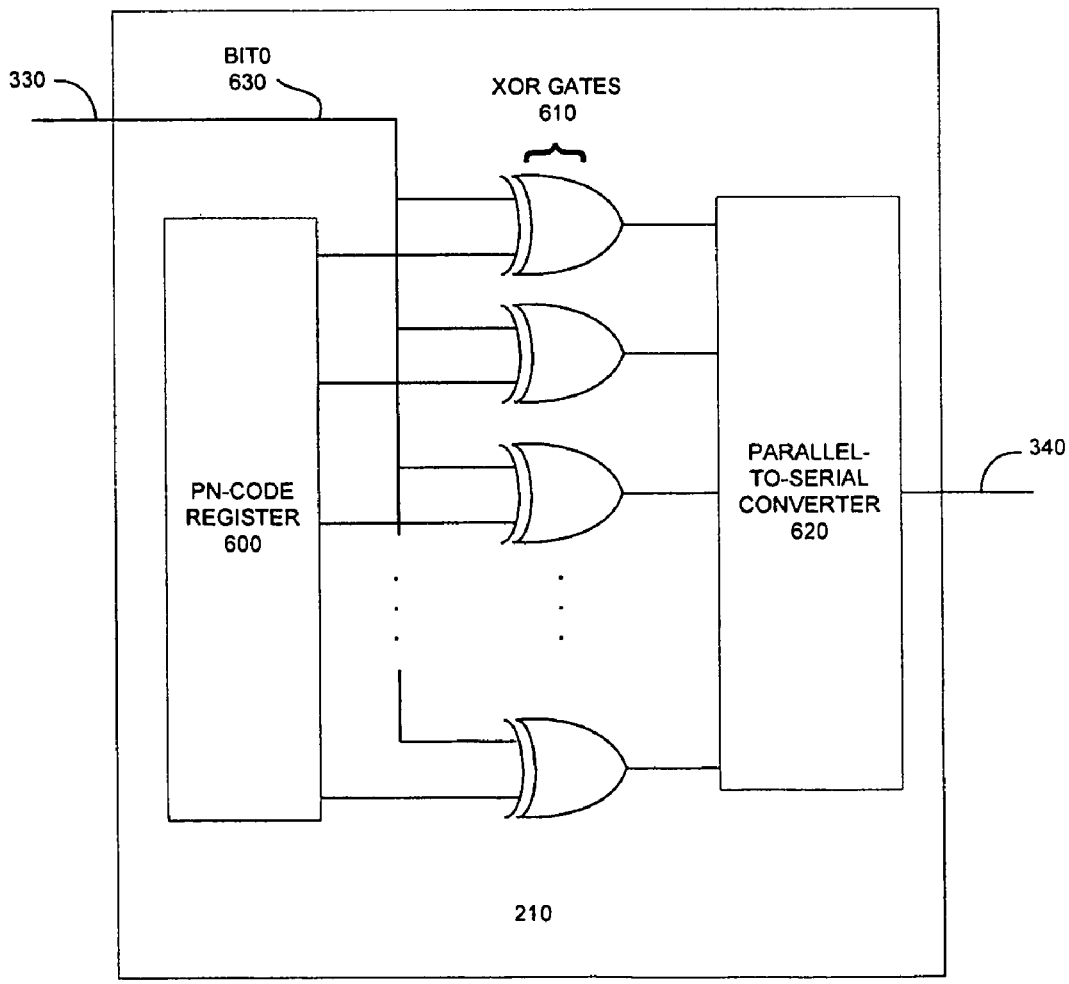
FIG. 3 shows an embodiment of an encoder circuit.

FIG. 3 shows an embodiment of an encoder 210. Serial data input BIT0 630 is received on connection 330 from the controller 260 and is one common input to a bank of XOR gates 610. The other inputs to the bank of XOR gates 610 are connected to PN-Code register 600. PN-Code register 600 is preloaded with PN-Code PNA. The length of the PN-Code register 600 and the number of XOR gates 610 is equal to the number of chips in PNA. The normal and customary operation of an XOR gate means that a logical 0 on one input will cause the output of the gate to be the same as the other input, whereas a logical 1 on one input will cause the output of the gate to be the inverse of the other input. This means that if BIT0 630 is a logical 0 then the output of the XOR gates 610 will be the same as PNA, while a logical 1 will cause the output of the XOR gates 610 to be the inverse of PNA (i.e. PNA-). The outputs of the XOR gates 610 are sent to parallel-to-serial converter 620 before being serially output on connection 340 to RF transmitter 230. RF transmitter 230 will then modulate the encoded data onto an RF carrier and send the resultant signal over connection 360 to antenna 250 for broadcast.

After all the data has been encoded and sent, the controller 260 sends out the end-of-packet (EOP 40) sequence to the RF transmitter 230 using connection 335. This entails sending the inverse of PN-Code PNB (PNB-) to the RF transmitter 230. The RF transmitter 230 will modulate the EOP sequence onto an RF carrier and send the resultant signal over connection 360 to antenna 250 for broadcast.

The encoding process and the transmission process is conventional except for the different PN-Codes that are used for the SOP and EOP. The mechanism for recognizing the PN-Codes is also conventional.

Receiving Data: Referring to FIGS. 1 and 2, data can be broadcast by DSSS adapters 500A, 500B or 500C simultaneously, however DSSS adapter 200 will only decode transmissions that are encoded with the same PN-Code used by decoder 220. Broadcast data is received on antenna 250 as an RF signal and is sent to RF receiver 240 on connection 360. The RF receiver de-modulates the RF signal from the RF carrier to recover the encoded data stream. The encoded data stream is sent to decoder 220 using connection 350.

Figure 4:
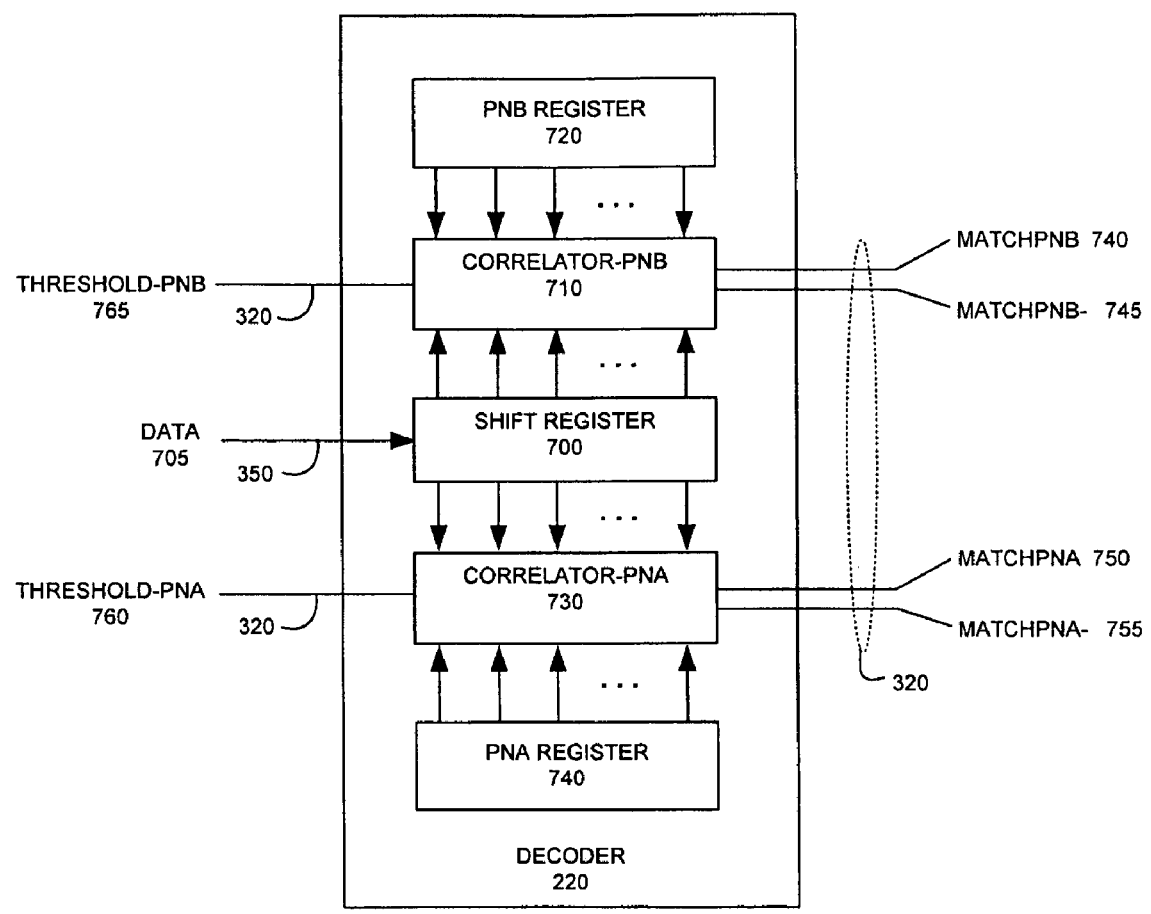
FIG. 4 shows an embodiment of a decoder circuit.

FIG. 4 shows a functional diagram of an embodiment of decoder circuit 220. The actual implementation can be done in hardware or in software. Furthermore the circuit can be implemented with various other architectural configurations to accomplish the same function.

In the specific embodiment shown here, the decoder 220 comprises a shift register 700, correlator-PNB 710, PNB register 720, correlator-PNA 730, and PNA register 740. The shift register 700 is used to receive data 705 serially from RF receiver 240. The PNB register 720 and PNA register 740 are used to store the PNB and PNA PN-Codes respectively. Correlator-PNB 710 and correlator-PNA 730 are standard correlators as used in DSSS applications and they are used to compare the shift register 700 to the PNB register 720 or PNA register 740 respectively.

The decoder 220 operates as follows: At the start of the operation, PNA register 740 is loaded with PN-Code PNA and PNB register 720 is loaded with PN-Code PNB. DATA 705 is encoded serial data received from RF receiver 240 and it is loaded into the shift register 700 one bit at a time. The correlator-PNB 710 then does a bit-by-bit comparison between the data in the shift register 700 and PNB register 720 for every bit received. A match between the two inputs is indicated by a logic one on output MATCHPNB 740. The correlator-PNB 710 also does a comparison between the data in the shift register 700 and the inverse of PNB register 720, with a match being indicated by a logic 1 on output MATCH-PNB-745. Additionally, the correlator-PNB 710 can be set to a threshold level by controller 260 using input THRESHOLD-PNB 765. The threshold level is used to tell the correlator how many bits need to match between the PNB register 720 and the shift register 700 before a match is indicated on MATCHPNB 740 or MATCHPNB-745, with the lower the threshold level the fewer the number of bits that need to match. A low threshold level increases the chance of data being decoded in noisy environments, however it also increases the chances of random noise being decoded as a valid match as well. The adjustment of the threshold is done in a conventional manner.

Correlator-PNA 730 performs a similar function as correlator-PNB 710, except it compares the PNA register 740 to the data in shift register 700 and outputs a logic 1 on MATCH-PNA 750 if there is a match, and a logic 1 on MATCHPNA-755 if there is a match to the inverse of PNA. Also, THRESHOLD-PNA 760 controls the comparison threshold of correlator-PNA 730.

Before a new packet is received the controller 260 waits for MATCHPNB 740 to be a logic one, thus indicating a match between the received data and PNB. Referring to FIG. 2, this indicates a possible SOP (SOP1 10). However, to make sure that the match was not the result of noise or interference in the system, the controller waits to see if the next bit pattern indicates a match to PNB as well (SOP2 20). The second match to PNB needs to occur immediately after the first match to PNB, therefore the controller needs to keep track of how many bits have been shifted into the shift register. Once the same number of bits has been shifted into the shift register as the length of the PNB, the controller looks to see if there is another match between the received data and the PNB register 720. If there is a match then MATCHPNB 740 will be a logic one and two back-to-back PNB sequences (SOP1 10 and SOP2 20) will have been received thus indicating a valid SOP indicator.

The controller 260, having detected a valid SOP sequence, next monitors MATCHPNA 750 and MATCHPNA-755 in order to decode the data packet. Output MATCHPNA 750 is a logic 1 when the correlator-PNA 730 detects a match between the data in shift register 700 and PNA register 740 that is above the threshold set by THRESHOLD-PNA 760. This means that a logic 0 has been decoded since the encoder in the transmitter replaced the logic 0s of the data with PNA before transmission. Controller 260 sends this information to computer 100 using connection 300.

Likewise, output MATCHPNA-755 is a logic 1 when there is a match between the data in shift register 700 and the inverse of PNA register 740 that is above the threshold set by THRESHOLD-PNA 760. This means that a logic 1 has been decoded since the encoder in the transmitter replaced the logic 1s of the data with the inverse of PNA before transmission. Controller 260 sends this information to computer 100 using connection 300.

The controller continues to monitor MATCHPNA 750 and MATCHPNA-755 until MATCHPNB-755 is a logic 1. Output MATCHPNB-755 is a logic 1 when there is a match between the incoming data in shift register 700 and the inverse of the PNB register 720 (i.e. PNB-). This indicates an EOP sequence as seen in FIG. 2 EOP 40 and the data packet is complete.

Sending an acknowledgement using PN-Codes: Many protocols require the receiver to acknowledge receipt of data by using an acknowledgement indicator. The embodiment described here provides a very efficient acknowledgement mechanism. An acknowledgement is transmitted by transmitting a single instance of PNB followed by a single instance of PNB-. Referring to FIG. 1, transmission of an acknowledgement can be initiated by controller 260 by first sending the PN-Code PNB to the RF transmitter 230 using connection 335 followed by PN-Code PNB-. The RF transmitter 230 would first modulate PNB and then PNB- onto an RF carrier and broadcast the resultant RF signal over antenna 250 using connection 360.

The receiver would receive the RF signal on antenna 250 and send it to RF receiver 240 on connection 360 for demodulation. Referring to FIG. 4, the resulting encoded signal would be shifted into shift register 700 and compared to PNB in the PNB register 720 by correlator 710. The correlator would then output a logic 1 on output MATCHPNB 740 to indicate a match with PNB. After the shift register is loaded with the next code word the correlator would then output a logic 1 on output MATCHPNB-745 to indicate a match with PNB-. The combination of MATCHPNB 740 followed by MATCHPNB-745 would indicate to the controller that an acknowledgement signal was received.

PN-Codes: The PN-Codes for the SOP/EOP indicators and the data packet need to have excellent cross-correlation properties with each other. That is, the chip pattern of the PN-Code used from the framing bits should be different enough from the PN-Code used for the data packet PN-Code that one code will not be mistaken for the other code even if a few chips are corrupted due to noise or interference. Using codes without excellent cross-correlation properties may cause the decoder to confuse the SOP/EOP indicators with the data thus erroneously decoding the data packet.

The following are two, 32-chip length, hexadecimal codes that can be used for the SOP/EOP indicator and for the data. (An example that has a longer code for the SOP/EOP indicator is given later). It is noted that the 0x designates that the code as a hexadecimal code. The two PN-Codes are:

1) 0x6AE701EA
2) 0x03FD13D2

Either one can be used for the SOP/EOP PN-Code with the other one being used for the data packet PN-Code. The following are other pairs of PN-Codes that can be used for other embodiments:

0xDCC06BB8, 0x2B09BBB2
0xA31EF2A4, 0x31327AB3
0x44833BDD, 0x14CF8EC9

0x35354EC5, 0xF35247B0
0x7C238ACE, 0x455C54D7
0x81ACFB83, 0x7A9A61AC
0x3C125F9C, 0x3998F68A

Another embodiment uses different length PN-Codes for the SOP/EOP indicators and for the data packet. It is noted that the implications of a lost or corrupted data bit are less severe than for a lost or corrupted framing bit. Thus, use of a longer PN-Code for the SOP/EOP PN-Code than for the data packet provides a higher signal-to-noise ratio for the SOP/EOP. A higher signal to noise ration for the SOP/EOP means that it is less susceptible to noise and interference.

It is noted that if the receiver misses the SOP indicator, the entire packet will be lost. On the other hand a computer may relatively easily correct a lost or corrupted data bit by using an error detection and correction algorithm. While it is possible to use a longer PN-Code for the data as well, the tradeoff is reduced data throughput since longer PN-Codes take more time to transmit versus shorter PN-Codes. However, it is noted that using one PN-Code length for the SOP/EOP indicators and another PN-Code length for the data packet adds complexity to the design of the DSSS encoder and decoder.

The following is an example of a 64-chip PN-Code that can be used for encoding the SOP/EOP indicators in a system that uses a 32-chip PN-Code to encode the data packet.

1) 64 bit PN-Code for the SOP/EOP indicators: 0xA646B59A3A30B6AD 2) 32 bit PN-Code for the data: 0x6AE701EA Various other embodiments are possible: The foregoing description for an improved method and apparatus for a method for providing packet framing in a DSSS radio system describes a specific embodiment; however, other embodiments are also possible.

One alternate embodiment utilizes a controller-less DSSS adapter. In such an embodiment the processing power of computer 100 replaces the functions of the controller 260.

One other embodiment uses a different number of SOP indicators at the start of the packet than does the embodiment described above. The preferred embodiment described above uses two SOP indicators (in FIG. 2 SOP1 10 and SOP2 20), however more or less than two indicators can be used as well. Additionally, a different configuration of SOP indicators can be used that combines PNA and PNB codes. Likewise, the EOP indicator can be more than a single indicator and can also be a combination of PNA and PNB codes. Similarly, the acknowledgement indicator can incorporate different combinations and quantities of PNB and PNB- instead of just a single PNB code followed by a single PNB-code.

Another embodiment combines framing with identification of different packet types. A packet type indicator could be combined with the SOP sequence to create a multi-bit sequence that is encoded into the header packet using the same PN-Code. Data would still be transmitted with a second PN-Code.

Another embodiment uses the framing PN-Code as an addressing mechanism. The framing code could be different for each address, even if the data PN-Code is the same. A receiver would only listen for the framing code that it is programmed to respond to, and then decode the data using the data code. If the framing code does not match then the data is ignored.

Another embodiment uses a different framing PN-Code for each transmitter whereas the receiver can decode the data using any of the framing PN-Codes used by the transmitters. This would enable the receiver to identify the sending transmitter based on the framing code used by that transmitter. Alternatively, the transmitters can all use the same framing code but different data PN-Codes in order to identify the source of the data.

Another embodiment uses a single PN-Code for the framing code and the data code. The framing of the data packet would be accomplished by using only the inverse of the PN-Code to indicate the SOP and EOP. The data is encoded by using the PN-Code to indicate a logic 0, whereas the absence of the PN-Code indicates a logic 1.

The inventive principles of the improved method and apparatus are applicable to various types of communication and protocols. Any protocol that uses indicators, such as SOP or EOP indicators, can utilize the present invention. Furthermore, any protocol that utilizes an ACK signal can utilize the present invention. The indicators can be SOP or EOP indicators or any other type of indicator or framing sequence.

The invention can be used with any type of RF transmission, which transmits data using a protocol that has indicators such as SOP or EOP indicators.

While the invention has been shown and described with respect to preferred embodiments thereof, it should be understood that a wide variety of other embodiments are possible without departing from the scope and sprit of the invention. The scope of the invention is only limited by the appended claims.

I claim:

1. A method of framing packets in a communications system comprising:
    encoding and transmitting a start-of-packet indicator, said start-of-packet indicator being encoded with a first pseudo-noise code (PN-code) word, wherein the start-of-packet indicator comprises two instances of the first PN-code word; and
    encoding and transmitting data, said data being encoded with a second PN-Code code word, wherein the communications system comprises a plurality of transmitters and each transmitter uses a different first PN-code word and the same second PN-code word.

2. The method of claim 1, including encoding and transmitting an end-of-packet indicator, said end-of packet indicator being encoded with said first PN-code word.

3. The method of claim 1, wherein the communications system is a direct sequence spread spectrum system.

4. The method of claim 1, wherein the end of packet indicator comprises an inverse of the first PN-code word.

5. The method of claim 1, wherein the start-of-packet indicator comprises the first PN-code word and the end-of-packet indicator comprises the inverse of the first PN-code word.

6. The method of claim 1, wherein the start-of-packet indicator includes a packet type identifier.

7. The method of claim 1, wherein the communications system comprises a plurality of transmitters and each transmitter uses the same first PN-code word and a different second PN-code word.

8. A computer readable medium having stored thereon instructions, which when executed by a processor, cause the processor to perform the method recited in claim 1.

9. A system for transmitting data over a communications channel comprising:
    a transmitter that transmits data packets over said communications channel by transmitting a start-of-packet indicator encoded with a first pseudo-noise code (PN-code) word, followed by data encoded with a second PN-code word, wherein the start-of-packet indicator comprises two instances of the first PN-code word; and
    a receiver that receives data packets from said communications channels and that decodes said start-of-packet indicator using said first PN-code word, and said data using said second PN-code word, wherein there is a plurality of transmitters and the first PN-code word is different for each transmitter and the second PN-code word is the same for all the transmitters.

10. The system of claim 9, wherein said transmitter transmits an end-of-packet indicator encoded with a first PN-code word after said data is transmitted, and said receiver determines that the transmission of a packet is complete by detecting an end-of-packet indicator coded using said first PN-code work.

11. The system of claim 9, wherein the system for communications is a direct sequence spread spectrum system.

12. The system of claim 9, wherein the receiver further sends an acknowledgement to the transmitter comprising a single instance of the first PN-code word and a single instance of the inverse of the first PN-code word.

13. The system of claim 10, wherein the end-of-packet indicator comprises one instance of the inverse of said first PN-code word.

14. The system of claim 9, wherein there is a plurality of transmitters and the second PN-code word is different for each transmitter and the first PN-code word is the same for all the transmitters.

15. A method of framing packets in a communications system comprising:

encoding and transmitting a start-of-packet indicator, said start-of-packet indicator being encoded with a first pseudo-noise code (PN-code) word; and encoding and transmitting data, said data being encoded with a second PN-Code code word, wherein the communications system comprises a plurality of transmitters and each transmitter of the plurality of transmitters uses a different first PN-code word and the same second PN-code word.

16. The method of claim 15, wherein the communications system is a direct sequence spread spectrum system.

17. The method of claim 15, wherein the start-of-packet indicator includes a packet type identifier.

18. A system for transmitting data over a communications channel comprising:

a first transmitter of a plurality of transmitters that transmits data packets over said communications channel by transmitting a start-of-packet indicator encoded with a first pseudo-noise code (PN-code) word, followed by data encoded with a second PN-code word, wherein the second PN-code word is different for each transmitter of the plurality of transmitters and the first PN-code word is the same for all transmitters of the plurality of transmitters; and a receiver that receives data packets from said communications channels and that decodes said start-of-packet indicator using said first PN-code word, and said data using said second PN-code word.

19. The system of claim 18, wherein said first transmitter transmits an end-of-packet indicator encoded with a first PN-code word after said data is transmitted, and wherein said receiver determines that the transmission of a packet is complete by detecting an end-of-packet indicator coded using said first PN-code word.

20. The system of claim 19, wherein the end-of-packet indicator comprises one instance of the inverse of said first PN-code word.

* * * * *

UNITED STATES PATENT AND TRADEMARK OFFICE
CERTIFICATE OF CORRECTION

PATENT NO.       : 7,623,565 B2                                        Page 1 of 1
APPLICATION NO. : 11/206373
DATED            : November 24, 2009
INVENTOR(S)      : David Wright It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this

Twenty-sixth Day of October, 2010

David J. Kappos
*Director of the United States Patent and Trademark Office*